May 4, 1965
G. L. HAMMON
3,182,334
VALVE AND RESTRICTOR FOR GAS TORCHES
Filed April 18, 1960
2 Sheets-Sheet 1
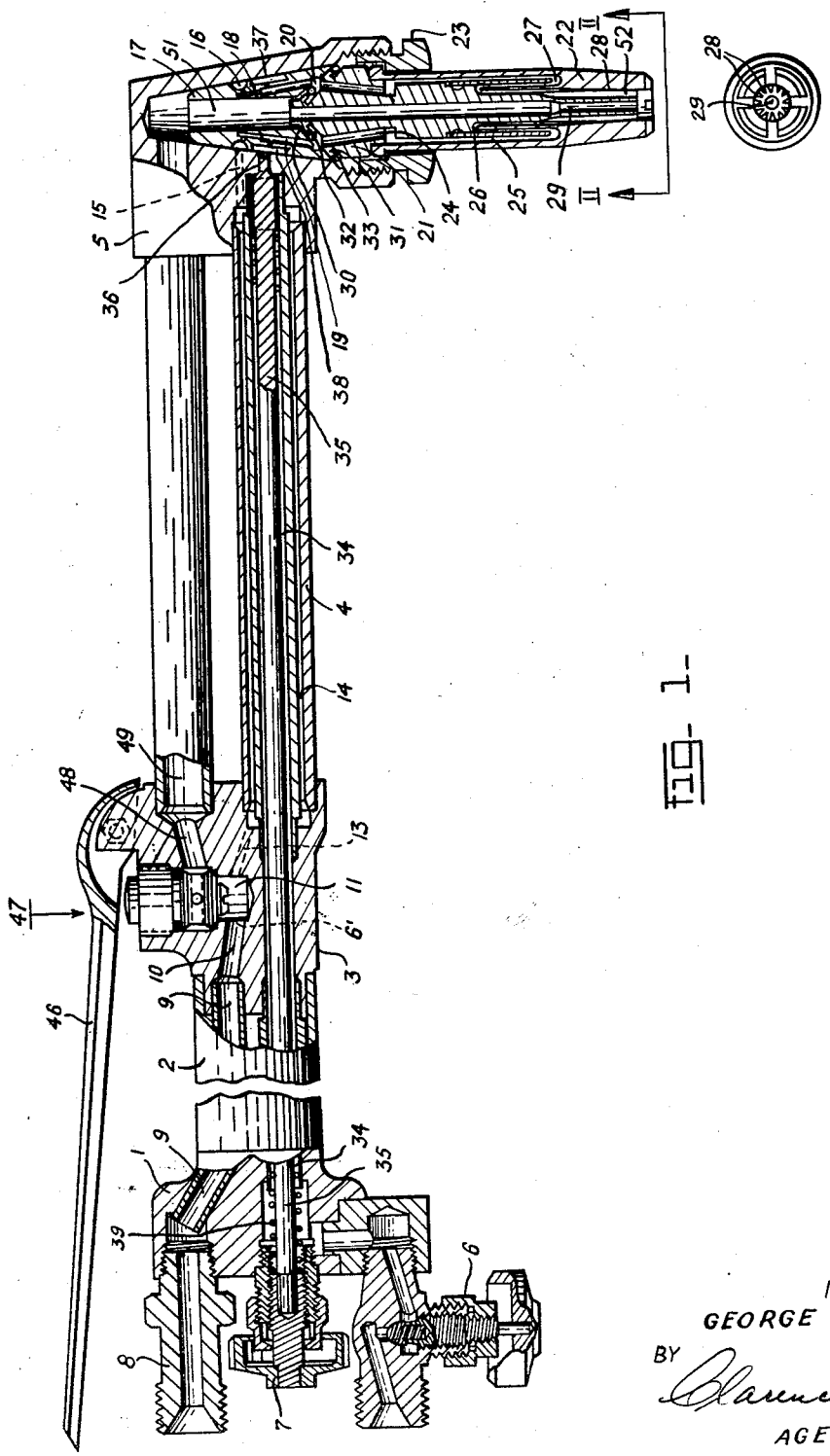
INVENTOR
GEORGE L. HAMMON
BY
Clarence W. Martin
AGENT

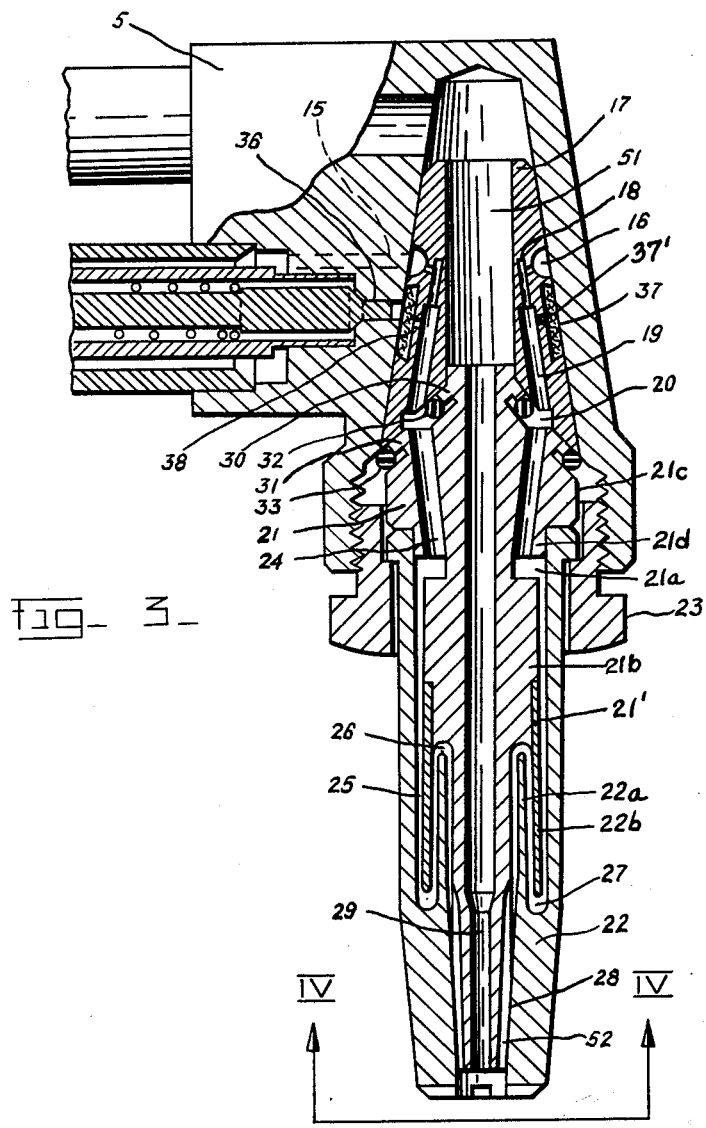

United States Patent Office 3,182,334
Patented May 4, 1965

3,182,334
VALVE AND RESTRICTOR FOR GAS TORCHES
George L. Hammon, Oakland, Calif., assignor to Hammon Precision Equipment Company, Oakland, Calif., a corporation of California
Filed Apr. 18, 1960, Ser. No. 22,944
1 Claim. (Cl. 251—121)

The present invention relates to improvements in cutting and welding torches by means of which petroleum products may be employed in place of the usual acetylene gasses.

An object of this invention is to provide an improved torch.

Another object is to provide a cutting and welding torch which employs liquid petroleum and oxygen under pressure to produce an extremely hot and steady flame.

Still another object is to provide a torch of the above character in which liquid petroleum products are transformed into a gassy state without requiring the use of auxiliary heating generators or the like.

Still another object is to provide a torch of the above character in which liquid petroleum products cannot flow out of the torch when the torch is not in use.

The above objects and others will become apparent from the following description of the drawings in which:

FIG. 1 is a side view, partially in section, of the welding and cutting torch;

FIG. 2 is a view taken along the line II—II of FIG. 1;

FIG. 3 is an enlarged view of the head of the torch; and

FIG. 4 is an enlarged view taken along the line IV—IV of FIG. 3.

The main body of the torch comprises a plurality of sections 1, 2, 3, 4, and 5 (FIG. 1) which are made separately for manufacturing ease and then assembled as an integral unit to form the torch body. Section 1 has three internally threaded portions to receive three respective nipples. Nipples 6 and 7 comprise a pair of valves for controlling the flow of liquid petroleum into the torch. The valve 7 is a fine adjustment valve which, when adjusted under working conditions, may be left set in such position while the valve 6 is merely used for turning the flow of petroleum, or gasoline, on and off. The nipple 8 is connected to an oxygen input line and oxygen flows directly through the nipple, an internal tube 9, and a passageway 10 where it enters a chamber 11. From the chamber 11 the oxygen is controlled by a valve generally indicated at 6' and similar to the valve 6, which valve 6' controls the flow of oxygen through the small tube 13 to the enlarged tube 14. From the tube 14 the oxygen passes through a small tube 15 where it empties into an annular groove 16 formed in a mixer unit 17 (FIG. 3). A plurality of tubes 18 have connection with the groove 16 to transmit oxygen to a plurality of aspirating tubes 19, where, as described hereinafter, the gasoline is mixed with the oxygen. Then the mixed gasses flow into an annular chamber 20 enclosed between the bottom of the mixer unit and the top part 21 of a two part cutting tip 21-22.

The two parts 21 and 22 are held together by means of a locking nut 23 which also serves to hold the cutting tip within portion 5 of the torch in closely abutting relationship with the mixer unit 17. From the annular chamber 20 the mixed gasses flow through a plurality of ports 24 cut through an enlarged circular head 21c of the first part and into a chamber formed by a recess 21a in part 21 and a portion of part 22. Then the gasses flow through a tube 25 formed between the inner wall of part 22 and the outer wall of a shank portion 21b of part 21 and its integral shell 21'. It should be noted that the part 21 is recessed as at 26 and that part 22 is recessed as at 27 so that a pair of annular prongs or shanks 22a and 22b are formed which interlock with each other to form an elongated, circuitous pathway extending from the tube 25 to the outlet tube 28. When the torch is not in use some gasses may condense within the tip, and the pathway which doubles back upon itself prevents the condensed vapors from accidentally emerging from the end of the torch and causing a hazard.

The terminal portion of the tip portion 21 is fluted as at 52 to increase the velocity of gas as it emerges from the tip. The outer circumference of the flutes contacts the inner wall of tip 22 and the flutes thus form a circular array of passages about a central oxygen port 29.

Although the walls which form the circuitous pathway 25, 26, 27 and 28 are, for purposes of illustration only, shown as being spaced apart to a considerable extent in FIG. 3, it should be noted that, in actual practise, the opposed walls are spaced apart only by a minimal amount which is in keeping with economical manufacturing practises. Preferably the walls are almost in contact with each other so that when the petroleum makes initial contact with one wall it immediately spreads to the opposite wall and flows along the walls due to capillary action. Meanwhile, even a minimal heat generated at the tip of the torch when it is initially lit is transferred to the walls of the passageway and, this action, when combined with the spreading action of the petroleum on the walls, produces a flash conversion so that the torch is ready for instantaneous use.

One of the problems encountered in torches of the type mentioned has been in providing a good seal between the mixer unit and the cutting tip. According to the invention, the upper portion 21 of the cutting tip is formed with a pair of annular skirts 30 and 31 which bear against respective shoulders of the mixer unit 17. These skirts flex slightly during the tightening of the nut 23 to permit the formation of an extremely tight seal without overstressing the mating parts.

It also has been found that a sealing ring such as one of the rings 32 and 33 may be provided to encircle each skirt 30, 31. The ring preferably is of such dimension that the upper edge of the ring projects slightly above the skirt. When the nut 23 is tightened and the skirts 30, 31 are moved into sealing relationship with the mixer unit, the rings are compressed and assist in such sealing action. Furthermore, since rings 32, 33 normally project above the skirts, the rings serve to protect the parts prior to assembly and during handling. It will be noted that if the upper portion 21 of the cutting tip were dropped on one of the unprotected skirts, the skirt would possibly become deformed and permit the escape of gas past the intended sealing surfaces. The rings, however, absorb such shock, and at worst, may be easily replaced, thus saving the price and inconvenience of replacing the tip 21.

Gasoline or other suitable liquid petroleum passes, under pressure, through the two valves 6 and 7 (FIG. 1) and emerges into a tube 34 extending the full length of the cutting torch from valve 7 to portion 5 of the torch. A valve stem 35 is fixed to the valve knob 7 and extends the full length of the tube 34. At its rightmost end the valve stem seats against the reduced shoulder 36. A spring 39, only a portion of which is shown, encircles the valve stem for the full length thereof and forms a spiral passageway for the liquid petroleum. The right end of the spring abuts a shoulder formed on the right end of the valve stem. With the valve seat 36 being located closely adjacent the mixer unit 17, a minimum amount of liquid petroleum stands between the valve seat and the torch head, thus virtually eliminating the tendency of the torch to drip when the valve is closed. Another advantage inherent in the above described arrangement is that in cases where backflash may be possible, then during such backflash the spring 39 which is closely confined within the walls of tube 34 as shown in FIG. 1 is compressed and the torch becomes self extinguishing.

The flow of gasoline through tube 34 and around spring 39 is restricted to a rate which is sufficient to maintain a wide range of burning operations of the torch but prevents the operator from accidentally or purposely forcing an excess of gasoline through the tube by shaking the torch. Such accidental forcing might occur during the knocking of slag off of the burning tip or by any movement of the torch involving a centrifugal force tending to force the gasoline towards the cutting tip. If such restricting means were not provided then an excess of gasoline could conceivably be forced into the burning tip thus changing the mixture or possibly even extinguishing the flame.

Petroleum is transmitted from the valve face 36 into an annular space 37 formed within the mixer unit 17. A porous wick band 38 is provided in the annular space 37 and encircles the mixer unit. The wick band insures that an equal amount of liquid fuel is distributed to a plurality of connecting ports 37' which empty into the previously mentioned tubes 19. In the absence of the wick band 18, the petroleum would tend to concentrate upon flowing through the port 37' which is nearest to the valve seat 36 to the exclusion of the other ports 37', thus mitigating against the proper mixing of the petroleum and oxygen in the mixer unit 17.

The shape of the tubes 19 is such that the oxygen under pressure, in moving from the smaller upper end into the lower end, produces a low pressure area tending to draw the gasoline into mixture with the oxygen. The mixed gasses then empty into the annular chamber 20 as previously described. The flow of gasses, now mixed, continues through the ports 24, through the passageways 25, 26, 27, 28 and are emitted at the lower end of the tip 22 where they are ignited.

When the valves have been properly adjusted to cause a flame to heat the object to the proper cutting temperature, the valve handle 46 (FIG. 1) is depressed to cause opening of a valve generally indicated at 47. Such valve opening permits the flow of pure oxygen from the chamber 11 through a tube 48 and along tube 49 to a chamber in the upper end of portion 5 of the torch. From there the pure oxygen is forced through a central aperture 51 of the mixer unit and through the central opening 29 of the tip 22 where it emerges in the center of the previously described flame to cause a cutting action in the usual manner.

The terminal face of the tip end has been cross milled as at 60 (FIG. 4) so that the flame cannot be extinguished even though the tip is accidentally brought in close proximity to the working surface of the metal to be heated or cut.

With the use of the above described torch it has been found that two gallons of gasoline provide up to twenty hours of operation of the torch with an 80% oxidizing action versus 50% oxidizing action for acetylene. Furthermore, not only does the torch lend itself to the use of liquid fuels with improved action, but at the same time, it provides a torch in which butane, propane, and acetylene may be used interchangeably. Since these fuels are readily accessible and under lower pressures than acetylene, it will be observed that the torch of this invention lends itself not only to commercial use but also to the occasional user who may not wish to tie up capital in the investment of the more costly acetylene storage equipment. Thus, the torch is seen to be more economical, more efficient, hotter, and more readily available for commercial and occasional use.

The cutting tip of the torch, described hereinbefore, and shown in enlarged section in FIGURE 3, forms the subject matter of claims in a divisional application Serial No. 189,484, filed April 23, 1962.

I claim:

A torch valve comprising,
a torch body portion having an elongated cylindrical passageway extending therethrough;
a valve seat in the body portion adjacent one end of said passageway;
a liquid gas input tube for supplying liquid gas to the other end of said passageway;
an elongated valve stem extending a substantial length through said body portion in said passageway and the end of the valve stem seating in said seat to close the valve, with the opposite end of the valve stem extending through said body to the exterior thereof to permit adjustment of the valve stem;
a coil spring in said passageway,
the ends of the spring lying adjacent opposite ends of the passageway,
the spring being independent of adjustment of the valve stem,
the spring closely surrounding the valve stem,
the spring having convolutions which are of a diameter to contact the walls of said passageway and form a circuitous path between the walls of the passageway and said valve stem,
said spring forms a portion of the circuitous path resisting an increase in flow of liquid gas occasioned by a force being exerted in a direction along the axis of said valve stem toward the valve seat; and
said spring being compressible in a direction from the valve seat to said input tube in response to a flashback at said valve seat to thereby restrict the circuitous path and extinguish the flashback.

References Cited in the file of this patent

UNITED STATES PATENTS

| | | |
|---|---|---|
| 1,050,763 | Cooper | Jan. 14, 1913 |
| 1,228,038 | Marlin | May 29, 1917 |
| 1,407,306 | Turpin et al. | Feb. 21, 1922 |
| 1,991,638 | Sunderman | Feb. 19, 1935 |
| 2,080,396 | Campbell | May 18, 1937 |
| 2,095,789 | Bucknam | Oct. 12, 1937 |
| 2,185,267 | Rice | Jan. 2, 1940 |
| 2,396,546 | Windsor | Mar. 12, 1946 |
| 2,507,102 | Hammon | May 9, 1950 |
| 2,588,555 | Molloy | Mar. 11, 1952 |
| 2,652,105 | Tjomsland et al. | Sept. 15, 1953 |
| 2,881,826 | Spies | Apr. 14, 1959 |

FOREIGN PATENTS

| | | |
|---|---|---|
| 672,786 | France | Sept. 23, 1929 |